United States Patent [19]

Akiba et al.

[11] Patent Number: 5,465,101
[45] Date of Patent: Nov. 7, 1995

[54] DISPLAY DEVICE

[75] Inventors: Nobuo Akiba; Isao Ohtsuka; Shigekazu Shiratori; Katsunori Kase, all of Mobara, Japan

[73] Assignee: Futaba Denshi Kogyo K.K., Mobara, Japan

[21] Appl. No.: 84,964

[22] Filed: Jul. 2, 1993

[30] Foreign Application Priority Data

Jul. 3, 1992 [JP] Japan ..................... 4-177049

[51] Int. Cl.$^6$ ..................... G09G 3/32; H04N 5/66
[52] U.S. Cl. ..................... 345/1; 345/903; 348/383
[58] Field of Search ..................... 345/189, 190, 345/192, 193, 200, 1, 33, 34, 51, 2, 3, 903; 340/172.5, 825.05, 825.07, 825.08, 825.17, 825.35, 825.36, 825.02, 825.52; 364/900; 341/23; 348/383

[56] References Cited

U.S. PATENT DOCUMENTS

| | | | |
|---|---|---|---|
| 3,657,706 | 4/1972 | Horgan et al. | 340/172.5 |
| 3,990,027 | 11/1976 | Kawashima | 340/825.52 |
| 4,617,566 | 10/1986 | Diamond | 340/825.05 |
| 4,660,141 | 4/1987 | Ceccon et al. | 364/200 |
| 4,897,651 | 1/1990 | DeMonte | 341/23 |
| 4,947,162 | 8/1990 | Kimura | 340/825.52 |
| 4,980,851 | 12/1990 | Komori et al. | 364/900 |
| 5,105,188 | 4/1992 | Jung et al. | 340/825.05 |

OTHER PUBLICATIONS

IBM Technical Disclosure Bulletin, "Synchronous Priority Selection", vol. 21, No. 12, May 1979, pp. 4937–4941.

*Primary Examiner*—Richard Hjerpe
*Assistant Examiner*—Steven J. Saras
*Attorney, Agent, or Firm*—Oblon, Spivak, McClelland, Maier & Neustadt

[57] ABSTRACT

A display device capable of permitting a plurality of display units connected together to carry out a series of displays through a single control section, to thereby automatically assign numbers to the display units. The control section and first- to six-stage display units are cascade-connected to each other, wherein the sixth- or last-stage module is connected at an output terminal thereof to an input terminal of the control section. The control section outputs an H signal in synchronism with the trigger signal of which the number of times of outputting is predetermined. The modules each normally outputs the L signal. However, the module outputs the H signal at a timing of the next trigger signal when it is fed with the H signal. Addition of 1 to the number of L signals in each of the modules at the time of N=6 permits a number of the module to be obtained. The control section grasps the number of modules connected based on the number of L signals input thereto.

1 Claim, 3 Drawing Sheets

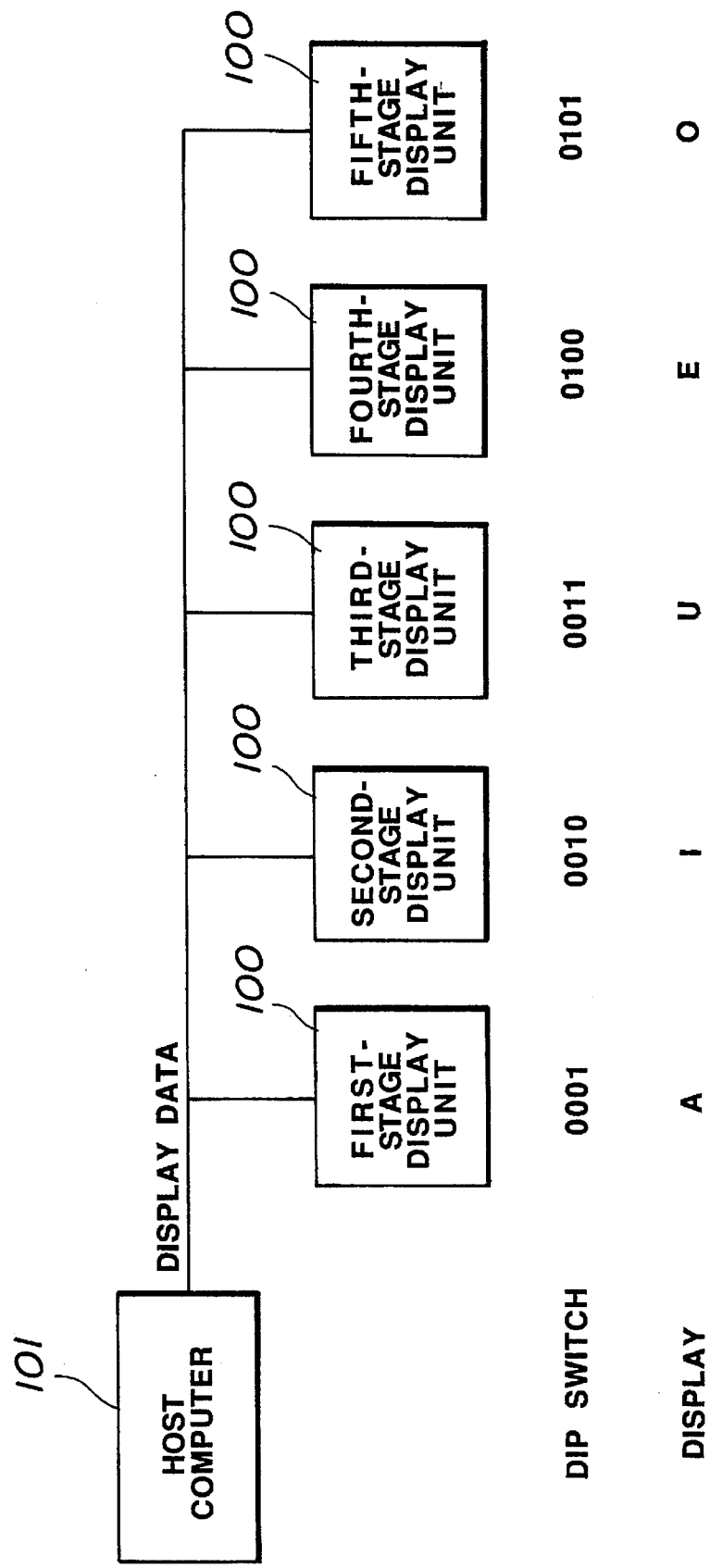

DISPLAY DEVICE

BACKGROUND OF THE INVENTION

This invention relates to a display device, and more particularly to a display device adapted to permit a plurality of display units connected to carry out a series of displays.

A conventional display device is generally constructed in such a manner as shown in FIG. 3. The display device includes a plurality of display units 100. In FIG. 3, five such display devices 100 are arranged. The display units 100 are commonly connected to a host computer 101, so that the host computer 101 transmits display data to the display units 100 according to a predetermined communication format. Each of the display units 100 is provided with a dip switch, which functions to assign a number to the display unit corresponding thereto. When the display data are transmitted from the host computer 101 to the display units 100, each of the display units 100 determines whether or not the display data transmitted thereto are required by the display unit through the dip switch, resulting in taking necessary display data therein for displaying.

For example, when it is desired that the display device shown in FIG. 3 displays "A, I, U, E, O"; "A", "I", "U", "E" and "O" are transmitted to the first- to fifth stage display units for displaying, respectively.

As will be noted from the above, the conventional display device requires a dip switch to be provided for every display unit in order to determine the number of each of the display units, leading to an increase in manufacturing cost of the display device.

Also, the conventional display device is highly troublesome in operation because it is required to set a number for each of the display units through the dip switch. Further, in the conventional display device, erroneous setting of the number leads to a failure in correct displaying. In addition, when a variation in arrangement of the display units due to movement or shifting of the display units or the like is carried out, it is necessary to change over the set number of each of the display units.

Moreover, the conventional display device fails to permit the number of display units currently connected to the host computer to be known on the side of the host computer. In order to detect the number of display units, it is necessary to transmit the number assigned to the final-stage display unit by means of the dip switch to the host computer.

SUMMARY OF THE INVENTION

The present invention has been made in view of the foregoing disadvantage of the prior art.

Accordingly, it is an object of the present invention to provide a display device which is capable of providing a display device for carrying out a series of displays by means of a plurality of display units connected which is capable of automatically assigning a number to each of the display units.

It is another object of the present invention to provide a display device which is capable of automatically assigning numbers to display units even when the display device are moved or shifted.

In accordance with the present invention, a display device is provided. The display device includes a plurality of display units cascade-connected to each other and a control section for feeding each of the display units with a data signal. The control section outputs a control signal, which is fed from the control section to the first-stage unit of the display units, intermediate ones of the display units and then the last-stage unit of the display units, followed by being returned from the last-stage display unit to the control section, to thereby judge the stage number of each of the display units.

In a preferred embodiment of the present invention, each of the display units includes an automatic discriminating circuit. The automatic discriminating circuit includes an H/L discriminating circuit for detecting a state of the control signal input thereto, a holding circuit for holding the control signal input thereto, an L counter circuit for counting an L signal when data output from the holding circuit to the next display unit are the L signal, a trigger counter circuit for counting the trigger signal to output a detection ending signal, a counted data holding circuit for holding data of which the number is counted by the L counter circuit when the detection ending signal is input thereto, and an operation circuit for operating data fed thereto from the counted data holding circuit to judge the stage number of the display unit.

In the display device of the present invention constructed as described above, the control section continuously feeds the first-stage display unit with an H signal which is the control signal in synchronism with the trigger signal. Each of the display units cascade-connected continues to feed the next display unit with the L signal until the H signal is fed as an input signal thereto, and feeds the next display unit with the H signal in synchronism with the next trigger signal when the H signal is input thereto. At the time when a predetermined number of trigger signals are output, an operation is carried out in each of the display units based on the number of L signals input thereto, to thereby calculate the stage number of the display unit. Also, the control signal output from the last-stage display unit is returned to the control section, resulting in the total stage number of display units currently connected being detected in the control section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 3 is a block diagram showing a conventional display device.

DETAILED DESCRIPTION OF THE PREFERRED EMBODIMENT

Now, a display device according to the present invention will be described hereinafter with reference to FIGS. 1 and 2.

Figure 1:
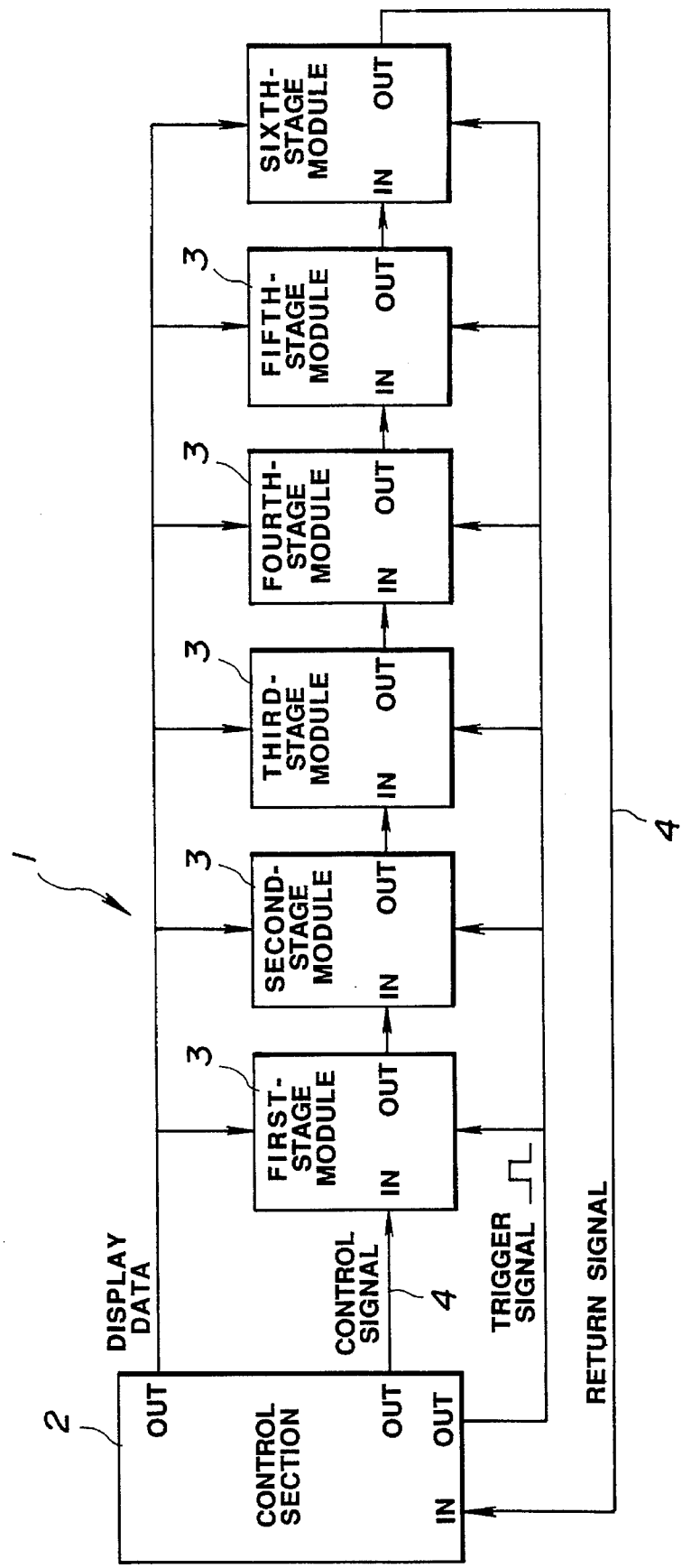
FIG. 1 is a block diagram showing an embodiment of a display device according to the present invention.
Figure 2:
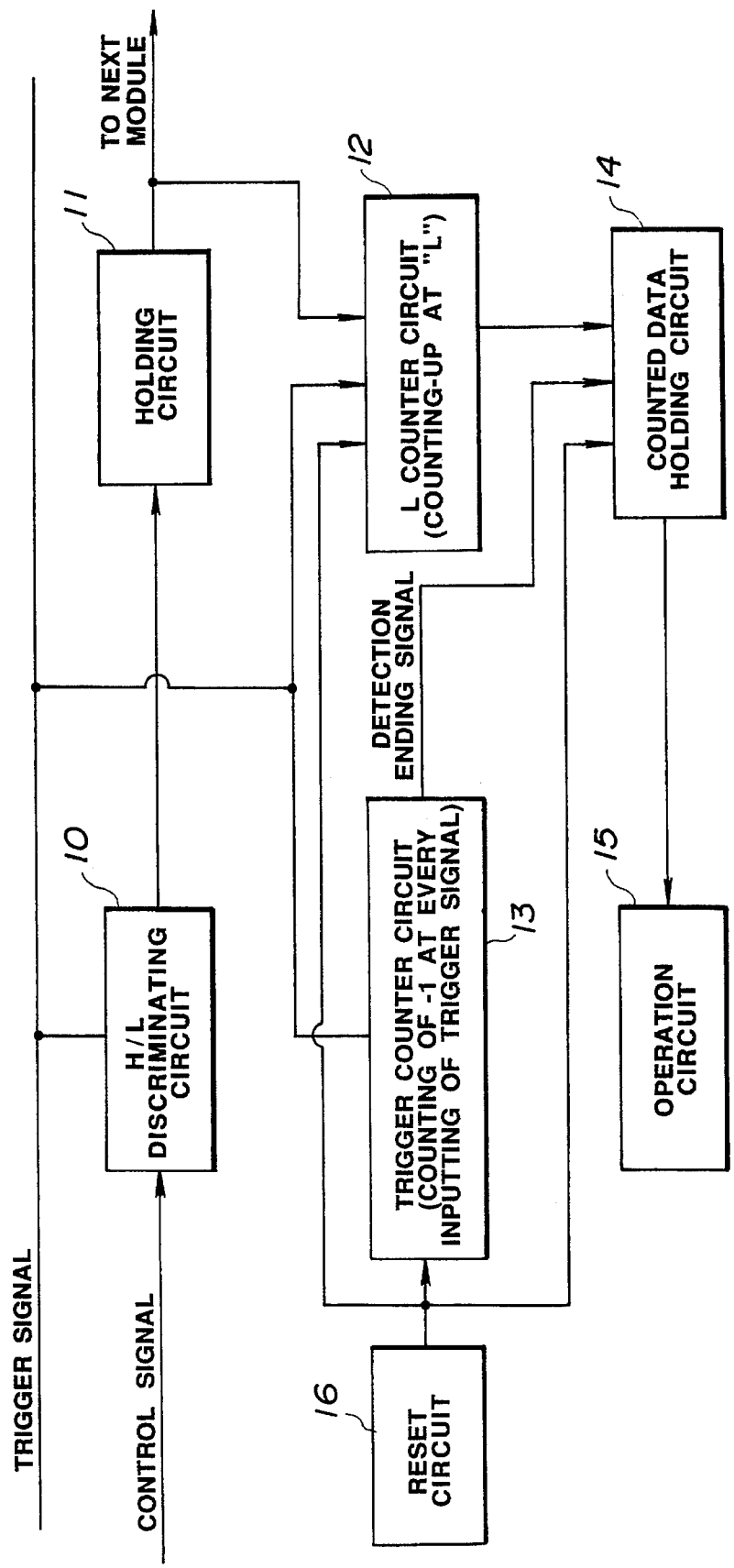
FIG. 2 is a circuit diagram showing an automatic judging or discriminating circuit for each of display units or modules in the display device shown in FIG. 1.

Referring first to FIG. 1, an embodiment of a display device according to the present invention is illustrated. A display device of the illustrated embodiment which is generally designated at reference numeral 1 generally includes a control section 2 and a plurality of display units (hereinafter referred to as "modules") 3. In the illustrated embodiment, six such modules or first- to sixth-stage modules are arranged. Each of the modules 3 includes a display element and a circuit section. The modules 3 are cascade-connected together by means of control signal lines 4 and then connected to the control section 2.

More particularly, the control section 2 includes an output terminal through which a control signal of the control section 2 is output. The output terminal of the control section 2 is connected to an input terminal of the first-stage module 3 through the control signal line 4. Then, the remaining five modules are connected in turn. More particularly, the second-stage module 3 which is connected at an input terminal thereof to an output terminal of the first-stage module 3 to the fifth-stage modules 3 are connected through input and output terminals thereof in turn. Thereafter, the sixth-stage or last-module 3 is connected at an output terminal to an input terminal of the control section 2. Such construction permits the control signal output from the control section 2 to be returned as a return signal through the modules 3 to the control section 2.

Also, the control section 2 is constructed so as to feed each of the modules 3 with display data and a trigger signal.

In the display device of the illustrated embodiment constructed as described above, the number N of trigger signals output from the control section 2 is predetermined and set in the control section 2 for detecting a number (stage number) of each of the modules 3. In the illustrated embodiment, N is set to be 6 because the number of modules 3 arranged is six (6).

In order to detect the number of each of the modules, the control section 2 feeds the first stage module 3 with an H signal functioning as the control signal in synchronism with the trigger signal. Each of the modules 3 is constructed so as to continue outputting of an L signal to the next-stage module 3 until it is fed with the H signal in synchronism with the trigger signal. Then, when the H signal is input to the module, it outputs the H signal by the next trigger.

Table 1 shows inputting and outputting of the control signals in the control section 2 and modules 3 with respect to the number N of trigger signals output.

TABLE 1

| CONTROL SIGNAL | CONTROL SECTION | | FIRST-STAGE MODULE | | SECOND-STAGE MODULE | | THIRD-STAGE MODULE | |
|---|---|---|---|---|---|---|---|---|
| N | IN | OUT | IN | OUT | IN | OUT | IN | OUT |
| 1 | L | H | H | L | L | L | L | L |
| 2 | L | H | H | H | H | L | L | L |
| 3 | L | H | H | H | H | H | H | L |
| 4 | L | H | H | H | H | H | H | H |
| 5 | L | H | H | H | H | H | H | H |
| 6 | L | H | H | H | H | H | H | H |
| 7 | H | H | H | H | H | H | H | H |
| : | : | : | : | : | : | : | : | : |
| N | H | H | H | H | H | H | H | H |
| MODULE NO. | NUMBER OF "Ls" INPUT = "6" | | NUMBER OF "Ls" INPUT + 1 = "1" | | NUMBER OF "Ls" INPUT + 1 = "2" | | NUMBER OF "Ls" INPUT + 1 = "3" | |

| CONTROL SIGNAL | FOURTH-STAGE MODULE | | FIFTH-STAGE MODULE | | SIXTH-STAGE MODULE | |
|---|---|---|---|---|---|---|
| N | IN | OUT | IN | OUT | IN | OUT |
| 1 | L | L | L | L | L | L |
| 2 | L | L | L | L | L | L |
| 3 | L | L | L | L | L | L |
| 4 | H | L | L | L | L | L |
| 5 | H | H | H | L | L | L |
| 6 | H | H | H | H | H | L |
| 7 | H | H | H | H | H | H |
| : | : | : | : | : | : | : |
| N | H | H | H | H | H | H |
| MODULE NO. | NUMBER OF "Ls" INPUT + 1 = "4" | | NUMBER OF "Ls" INPUT + 1 = "5" | | NUMBER OF "Ls" INPUT + 1 = "6" | |

As will be noted from Table 1, the control section 2 feeds the first-stage module 3 with the H signal as the control signal in synchronism with the trigger signal. The first-stage module 3 detects inputting of the H signal thereto and then feeds the second-stage module 3 with the H signal at the next timing of the trigger signal. Thereafter, the H signal is likewise transmitted to the subsequent modules in turn.

Each of the modules 3 continues outputting the L signal until it is fed with the H signal. Therefore, addition of one (1) to the number of L signals input to each of the modules 3 at the time when the trigger signal of N=6 is output permits a number (stage number) of the module 3 to be obtained. Also, the number of L signals input from the last-stage module 3 to the control section 2 indicates the total number (total stage number) of modules. In the illustrated embodiment, an operation in each of the modules 3 is carried out on the basis of the number of L signals input thereto. However, when the number of L signals output from the module 3 is used for this purpose, the above-described addition of 1 in the operatigon is not required.

Now, an automatic judging or discriminating circuit which is included in the circuit section of the module 3 will be described hereinafter with reference to FIG. 2.

The control signal fed from the module 3 or control section 2 as described above is input to an H/L discriminating circuit 10 in synchronism with the trigger signal, resulting in a state (H or L) of the control signal being discriminated. Then, the control signal is held in a holding circuit 11 and then fed to the next module 3 in synchronism with the next trigger signal.

The holding circuit 11 is connected to an L counter circuit 12, which functions to count up inputting of the L signal in synchronism with the trigger signals when the control signal is at the state of "L".

To the L counter circuit 12 is connected a trigger counter circuit 13, in which the number of times the trigger signal set in the control section 2 is output automatically set and counted down each time the trigger signal is input thereto. Then, the trigger counter signal 13 outputs a detection ending signal when the number of times of the outputting is counted down to zero (0).

Reference numeral 14 designates a counted data holding circuit, which functions to hold the data counted in the L counter circuit 12 when it receives the above-described detection ending signal. Also, the counted data holding circuit 14 automatically increases counting of the thus held data by +1.

Reference numeral 15 is an operation circuit connected to the counted data holding circuit 14, which functions to consider the data held in the counted data holding circuit 14, to thereby confirm the module number.

Reference numeral 16 designates a reset circuit connected to the trigger counter circuit 13, L counter circuit 12 and counted data holding circuit 14. The reset circuit 16 functions to reset the trigger counter circuit 13, L counter circuit 12 and counted data holding circuit 14, to thereby permit the module number to be automatically judged, when a power supply therefor is turned on.

As can be seen from the foregoing, the display device of the present invention eliminates arrangement of a dip switch for every module as required in the conventional display device, to thereby significantly simplify the structure and reduce the manufacturing cost.

Also, the present invention can automatically set the module number, to thereby eliminate labor and time required for setting it and an error in the setting. Further, it eliminates overlapping or missing of the module numbers, to thereby assign serial numbers to the modules.

In addition, the present invention permits the number of modules currently connected to be automatically detected on the side of the control section.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A display device, comprising:

a plurality of cascade-connected display units;

a control means for outputting display data signals to each of said plurality of display units and for outputting a control signal to a first-stage display unit of said plurality of display units, said control signal changing an output state of said first-stage display unit which thereby changes an input state of a second-stage display unit cascade-connected to said first-stage display unit, wherein the output states of successive units of said plurality of cascade-connected display units change in correspondence with successive trigger pulses output by a trigger counter circuit which supplies said trigger pulses simultaneously to each of said plurality of display units wherein each of said display units comprises an automatic discriminating circuit for discriminating a level of an output signal output from a preceding display unit which corresponds to the output state of said preceding display unit and wherein said automatic discriminating circuit comprises an H/L discriminating circuit for discriminating the level of said output signal a holding circuit for holding said output signal an L counter circuit for counting a number of low level output signals output from the display unit a counted data holding circuit for holding data corresponding to the number of low level output signals counted by said L counter circuit and an operation circuit for determining a stage number of each of said plurality of cascade-connected display units in accordance with said data held by said counted data holding circuit.

\* \* \* \* \*